US006305014B1

(12) United States Patent
Roediger et al.

(10) Patent No.: US 6,305,014 B1
(45) Date of Patent: Oct. 16, 2001

(54) LIFETIME-SENSITIVE INSTRUCTION SCHEDULING MECHANISM AND METHOD

(75) Inventors: Robert Ralph Roediger; William Jon Schmidt, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/099,360

(22) Filed: Jun. 18, 1998

(51) Int. Cl.[7] ............................... G06F 9/44; G06F 9/45
(52) U.S. Cl. ........................................ 717/9; 717/5; 717/6
(58) Field of Search ..................... 395/709, 708; 717/5, 6, 9

(56) References Cited

U.S. PATENT DOCUMENTS

| | | | |
|---|---|---|---|
| 5,386,562 | * | 1/1995 | Jain et al. ............................ 395/650 |
| 5,761,514 | * | 6/1998 | Aizikowitz et al. ................. 395/709 |
| 5,812,854 | * | 9/1998 | Steinmetz et al. ................... 395/709 |
| 5,828,886 | * | 10/1998 | Hayashi .............................. 395/709 |
| 5,930,510 | * | 7/1999 | Beyun et al. ........................ 395/709 |
| 6,009,272 | * | 12/1999 | Goebel ................................ 395/709 |

OTHER PUBLICATIONS

Mantripragada et al, 'A New Framework for Integrated Global Local Scheduling': IEEE pp. 167–174, Mar. 1998.*
Mangione–Smith et al, 'Register Requirements of Pipelined Processors', ACM pp. 260–271, Jun. 1992.*
Silvera et al, 'A Register Pressure Sensitive Instruction Scheduler for Dynamic Issue Processors', IEEE pp. 78–89, Mar. 1997.*
Eichenberger et al, 'Register Allocation for Predicated Code', IEEE, Micro–28 pp. 180–191, 1995.*
Gillies et al., 'Global Predicate Analysis and its Application to Register Allocation', IEEE pp. 114–125, 1996.*
Chou et al., 'An Optimal Instruction Scheduler for Superscalor Processor', IEEE pp. 303–313, 1995.*
Chang et al., 'Efficient Exploitation of Instruction–Level Parallelism for Superscaler Processors by the Conjugate Register File Scheme', IEEE pp. 278–293, 1996.*
Ramakrishna et al., 'Storage Allocation Strategies for Data Path Synthesis of ASICs', IEEE pp. 41–44, 1994.*
Koseki et al, 'A Register Allocation Technique Using Guarded PDG', ACM pp. 270–277, 1996.*
Lu et al., 'A Lifetime–Sensitive Scheduling Method'IEEE pp. 351–354, May 1996.*
Franklin et al., 'Register Traffic Analysis for Streamlining Inter–Operation Communication in Fine–Grain Parallel Processors', IEEE pp. 236–245, Sep. 1992.*
Norris et al. An Experimental Study of Several Cooperative Register Allocation and Instructions Scheduling Strategies. IEEE. pp. 169–179, 1995.*
Koseki et al. A Register Allocation Technique Using Guarded PDG. ACM. pp. 270–277, 1996.*

* cited by examiner

*Primary Examiner*—Reba I. Elmore
(74) *Attorney, Agent, or Firm*—Martin & Associates, L.L.C.; Derek P. Martin

(57) ABSTRACT

An instruction scheduler in an optimizing compiler schedules instructions in a computer program by determining the lifetimes of fixed registers in the computer program. By determining the lifetimes of fixed registers, the instruction scheduler can achieve a schedule that has a higher degree of parallelism by relaxing dependences between instructions in independent lifetimes of a fixed register so that instructions can be scheduled earlier than would otherwise be possible if those dependences were precisely honored.

20 Claims, 9 Drawing Sheets

```
sub        GPRa = GPRb,GPRc
add.       GPRd,XER,CR0 = GPRa,GPRd
select     GPRe = 0,1,XER
or.        GPRf,XER,CR0 = GPRg,GPRh
lcrcr      CRk = CR0
```

| CYCLE | Ready List |
|-------|-----------|
| 0 | sub |
| 1 | add. |
| 2 | select |
| 3 | or. |
| 4 | lcrcr |

| CYCLE | P1 | P2 |
|-------|--------|----|
| 1 | sub | -- |
| 2 | add. | -- |
| 3 | select | -- |
| 4 | or. | -- |
| 5 | lcrcr | -- |

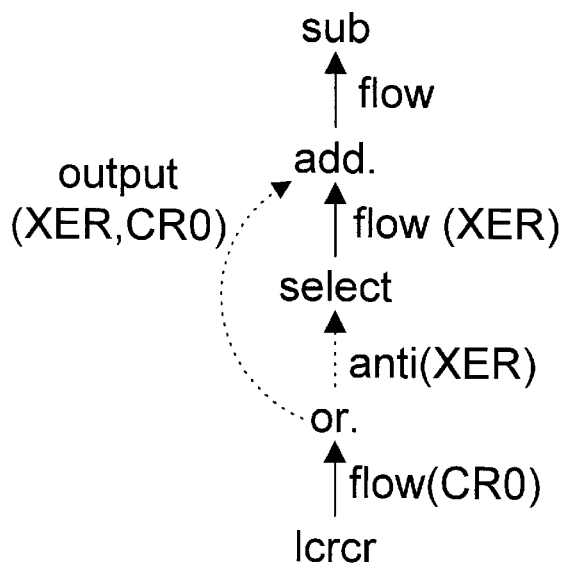
FIG. 7
| CYCLE | Ready List |
|---|---|
| 0 | sub |
|   | or. |
| 1 | lcrcr |
| 2 | add. |
| 3 | select |
FIG. 8
| CYCLE | P1 | P2 |
|---|---|---|
| 1 | sub | or. |
| 2 | lcrcr | -- |
| 3 | add. | -- |
| 4 | select | -- |
FIG. 9
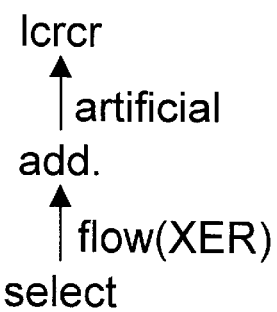
FIG. 10

```
sub      GPR10 = GPR3,GPR4
add_0    GPR11 = GPR10,GPR14
mult_0   GPR12 = GPR11,GPR5
add_1    GPR11 = GPR9,GPR14
mult_1   GPR16 = GPR11,GPR17
```
1500
FIG. 15
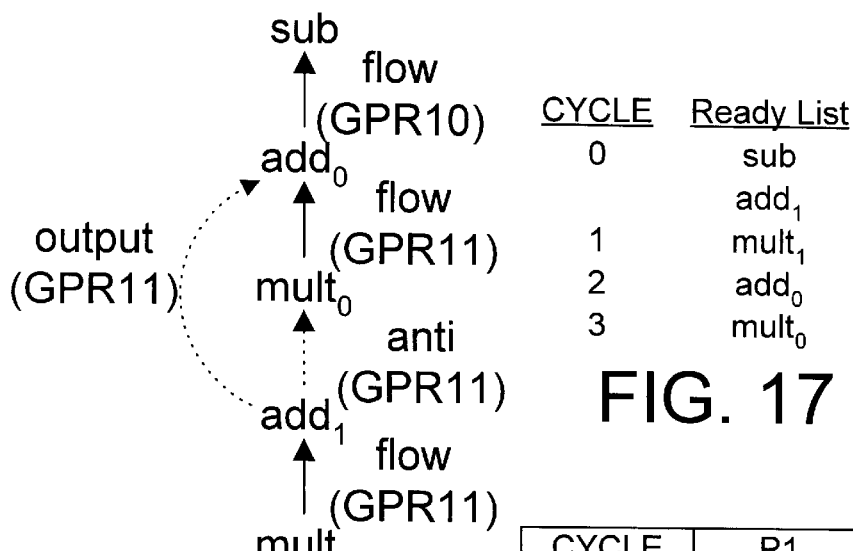
FIG. 16
FIG. 17
| CYCLE | P1 | P2 |
|---|---|---|
| 1 | sub | add_1 |
| 2 | mult_1 | -- |
| 3 | add_0 | -- |
| 4 | mult_0 | -- |
FIG. 18
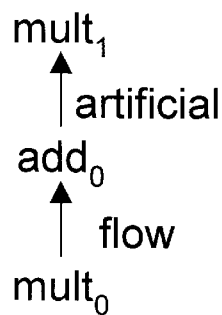
FIG. 19

LIFETIME-SENSITIVE INSTRUCTION SCHEDULING MECHANISM AND METHOD

BACKGROUND OF THE INVENTION

1. Technical Field

This invention generally relates to the optimization of computer programs, and more specifically relates to a computer mechanism and method for determining the scheduling of instructions in a computer program.

2. Background Art

The development of the EDVAC computer system in 1948 is generally considered the beginning of the computer era. Since that time, dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

Computer hardware has evolved to provide faster execution of computer programs. For example, most modern processors include multiple instruction pipelines that can process two instructions in parallel if the two instructions are not dependent on each other. In an environment with multiple pipelines, the execution time of a computer program, especially complex computer programs, is a function of the arrangement of the instructions within the computer program. Modern compilers typically include an instruction scheduling mechanism that determines the dependences among instructions and produces a schedule or ordering of instructions in an attempt to maximize the parallelism in the computer program by scheduling, when possible, instructions to be executed simultaneously by different pipelines. However, known compilers do not take advantage of some parallelism that may exist in the computer program. Without an improved instruction scheduling mechanism and method, pipelines in a computer system will not be used to their maximum potential, and performance of computer systems will therefore suffer.

DISCLOSURE OF INVENTION

According to the present invention, an instruction scheduler in an optimizing compiler schedules instructions in a computer program by determining the lifetimes of fixed registers in the computer program. By determining the lifetimes of fixed registers, the instruction scheduler can achieve a schedule that has a higher degree of parallelism by relaxing dependences between instructions in independent lifetimes of a fixed register so that instructions can be scheduled earlier than would otherwise be possible if those dependences were precisely honored.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 7 is a conditional dependence graph for the code portion of FIG. 2 in accordance with a preferred embodiment;

FIG. 8 is a ready list that results from instruction scheduling for the code portion of FIG. 2 according to a preferred embodiment;

FIG. 9 is an instruction schedule for the code portion of FIG. 2 that results from instruction scheduling according to a preferred embodiment;

FIG. 10 is a revised dependence graph of the conditional dependence graph of FIG. 7 according to a method for scheduling instructions according to a preferred embodiment;

FIG. 15 is another sample of a portion of code for illustrating the concepts of instruction scheduling in accordance with a preferred embodiment;

FIG. 16 is a conditional dependence graph for the code portion of FIG. 15 in accordance with a preferred embodiment;

FIG. 17 is a ready list that results from instruction scheduling for the code portion of FIG. 15 according to a preferred embodiment;

FIG. 18 is an instruction schedule for the code portion of FIG. 15 that results from instruction scheduling according to a preferred embodiment; and FIG. 19 is a revised dependence graph of the conditional dependence graph of FIG. 16 according to a method for scheduling instructions according to a preferred embodiment.

BEST MODE FOR CARRYING OUT THE INVENTION

Figure 1:
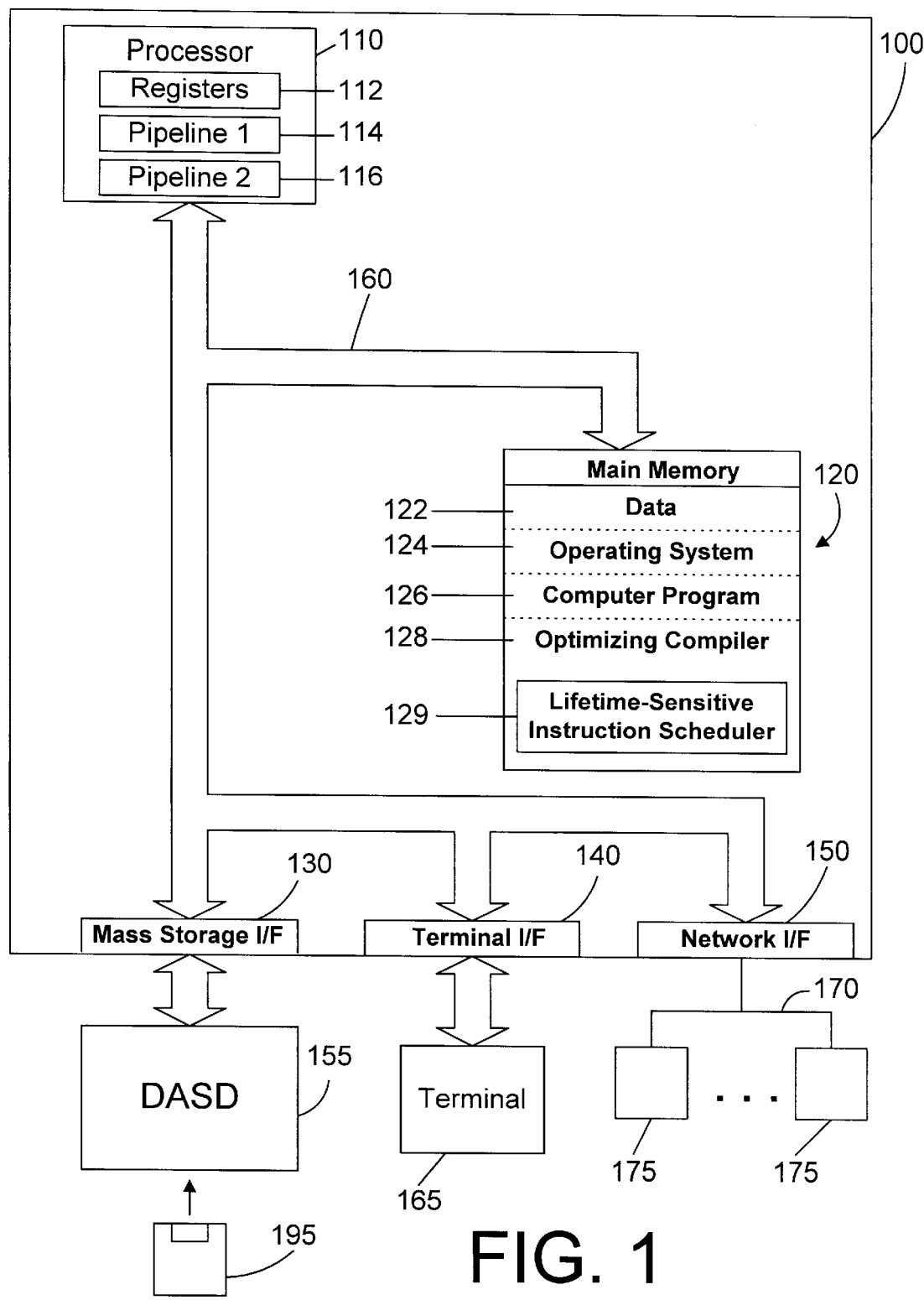
FIG. 1 is a block diagram of an apparatus in accordance with a preferred embodiment of the present invention.

The present invention is used in a programming environment for developing computer programs. For those who are not familiar with compilers and optimization in a programming environment, the brief overview below provides background information that will help the reader to understand the present invention.

1. Overview

Compilers

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction stream. The programmer then uses mechanisms that change this human readable source code into a machine readable form (machine language program or object code) that can be understood by a computer's processor. This machine readable form, within this specification, is a stream of binary instructions (i.e., ones and zeros) that are meaningful to the computer's processor. Mechanisms for converting source code to machine code are typically called compilers; however, it should be understood that the term "compiler", as used within this specification, generically refers to any mechanism that transforms one representation of a computer program into another representation of that program.

The compiler typically compiles each programming language statement in the source code into one or more machine language instructions in the resulting object code. This is usually a two step process, with the first step performed by the compiler "front end" and the second step performed by the compiler "back end". The front end of the compiler typically translates the source code statements into one or more lower level intermediate language instructions. The back end of the compiler then takes this intermediate language program and translates it into a machine language program that the computer's processor understands.

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers.

Symbolic and Physical Registers

A compiler may take multiple passes or stages to process a source code instruction stream. During early stages, the compiler typically assumes that an unlimited number of physical registers are available for the target central processing unit (CPU) to use. Thus, each time a program variable is encountered, it is assigned a new register in the intermediate language. However, in reality, the CPU typically has a fixed number of registers to use while executing a machine code instruction stream. Since the registers used in the intermediate language instruction stream have no correlation to physical CPU registers, they are known as symbolic registers. In a process known as register assignment, the optimizing compiler typically must allocate the large number of symbolic registers to a much smaller number of physical registers available to the CPU. During optimization phases after register assignment, all registers in the instruction stream are fixed registers.

Lifetimes of Program Variables

For purposes of this invention, a "lifetime" of a fixed register is a set of instructions that operate with that register, either by "defining" the register (i.e., assigning it a value), or "using" the register (i.e., reading the current value in the register and using it in a computation). The lifetime contains a single defining instruction, and zero or more subsequent instructions that use the value stored by the defining instruction. Other instructions that neither define nor use the register may be interspersed with the instructions belonging to the lifetime, but these interspersed instructions are not considered part of the lifetime. Note that the concept of lifetime herein is simplified to illustrate the concepts of the present invention. For example, a lifetime could include multiple definitions of a fixed register. Those skilled in the art are familiar with the concept of lifetimes, and the simplified definition used herein shall not be construed as limiting the application of the present invention.

Optimization

Most compilers perform some optimizations on the program to make it run faster. These optimizations can improve a program's performance, but they must not change the function that it performs. Two different types of optimizations may be performed: machine-independent optimizations, and machine-dependent optimizations. Many known compilers perform both types of optimizations. Machine-independent optimizations are typically performed on the source code or intermediate code instruction streams. Machine-dependent optimizations are typically performed either directly on object code, or on an intermediate code instruction stream that is very close to the object code. In the latter case, optimizations may be done either before or after register assignment.

The compiler itself can perform optimizations or they may be performed by a separate computer program. Optimizations can take on many forms. Some examples of optimizations are: eliminating common subexpressions, eliminating dead code, using registers more efficiently, optimizing loops, and scheduling instructions to more efficiently use available instruction pipelines.

Instruction Scheduling

Instruction scheduling may occur at different stages of compilation. For example, a first pass at instruction scheduling might operate on the intermediate code instruction stream prior to register assignment. The instruction scheduler at this point is dealing with symbolic registers. Then, once symbolic registers have been allocated to physical registers, a second pass at instruction scheduling may then be performed. At this stage, the instruction scheduler is scheduling instructions that operate on fixed processor registers in the computer system.

The goal of instruction scheduling is to maximize the speed of executing the computer program by executing as many instructions as possible in the shortest possible time. When targeting a processor with only one pipeline, the instruction scheduler analyzes dependences among instructions and then arranges them to avoid "stalls" caused when one instruction must wait for another instruction to complete. In a processor with multiple pipelines, the instruction scheduler further determines which instructions can be scheduled for simultaneous execution in separate pipelines.

Instruction schedulers operation upon a "window" of instructions. For the discussion herein, we assume that the window of instructions to be scheduled is already defined, and the number of instructions included is not important to an understanding of the mechanisms of the present invention. An example below is provided to explain prior art techniques for instruction scheduling.

Example of Prior Art Instruction Scheduling

Figures 2, 3, 4, 5:
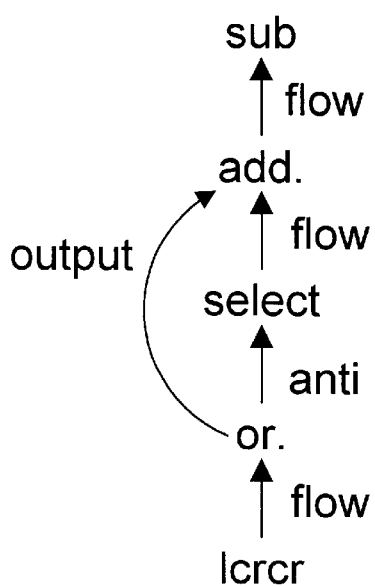
FIG. 2 is a sample of a portion of code for illustrating the concepts of instruction scheduling.
FIG. 3 is a dependence graph for the code portion in FIG. 2 according to the prior art.
FIG. 4 is a ready list that results from instruction scheduling for the code portion of FIG. 2 according to the prior art.
FIG. 5 is an instruction schedule for the code portion of FIG. 2 that results from instruction scheduling according to the prior art.

This example assumes that the window of instructions to be scheduled is the code portion shown in FIG. 2, which includes five instructions. The add. and or. instructions are special versions of these instructions called "recording form" instructions. A recording form instruction is an instruction that performs the desired operation, then records information about the result in an exception register or a a condition register. Recording form instructions are known in the art, such as in the PowerPC architecture. The select instruction is an instruction that sets the value of a register depending on the status of a condition value in the XER register. For the code portion in FIG. 2, we assume that a lower case letter denotes any one register out of a set of general purpose registers. Thus, GPRa is representative of any particular General Purpose Register (GPR) in the available set of registers. The XER and CR0 registers, in contrast, are fixed registers in the processor's register set that perform special and unique functions. The XER is a single exception register that reflects the status of exceptions for certain instructions. The CR0 instruction is a single condition register that is used by certain instructions to indicate whether or not an instruction has caused certain conditions to occur. Both the XER and CR0 are registers that are modified by certain instructions in the instruction set of the PowerPC processor. Note, however, that many processors and computer architectures include these and other types of fixed registers that are dedicated to specific functions. The lcrcr instruction copies the value from the fixed condition register CR0 into a symbolic condition register CRk. For the purpose of the discussion herein, we also refer to a "fixed register" as a "bottleneck register". A bottleneck or fixed register may refer to a register such as XER and CR0 in the intermediate code instruction stream, or may refer to any register after register allocation has allocated symbolic registers to physical processor registers.

Figure 6:
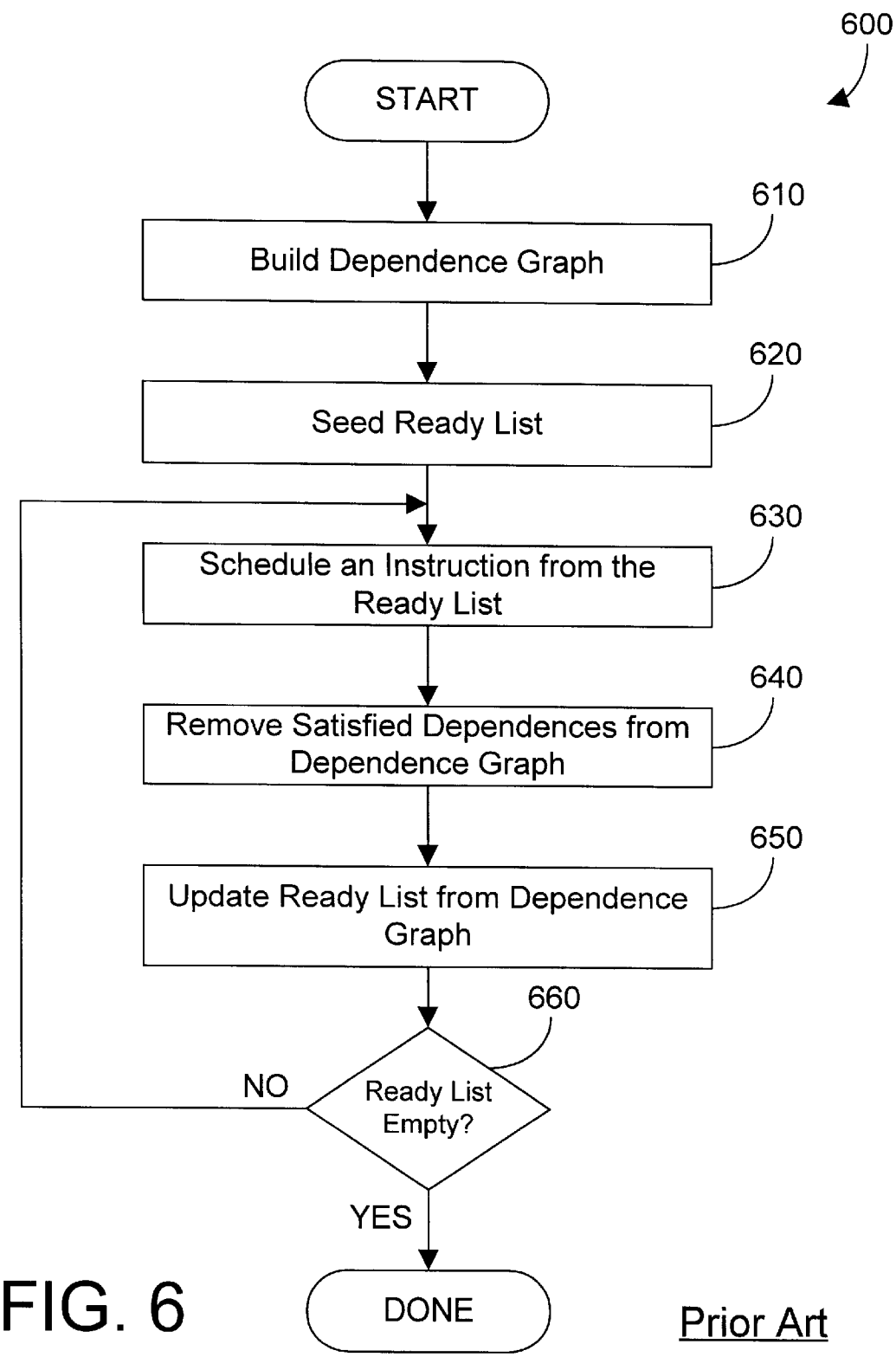
FIG. 6 is a prior art method for scheduling instructions.

Most known instruction schedulers use a list scheduling technique. Referring to FIG. 6, a method 600 for scheduling instructions in accordance with the prior art begins by analyzing all of the dependences that impose orderings upon the instructions in its window, and builds a dependence graph (step 610). FIG. 3 is a representation of a dependence graph for the code portion of FIG. 2. The add. instruction has what is known as a "flow dependence" on the sub instruction because the add. instruction uses the value of GPRa, which is defined in the previous sub instruction. So the sub instruction must be scheduled before the add. instruction to assure proper results. The select instruction has a flow dependence on the add. instruction because the value assigned to GPRe depends on the value in the fixed-point exception register XER, which is set in the previous add. instruction. The or. instruction has an anti-dependence on the select instruction, because XER must be used in the select instruction before it is defined again in the or. instruction. The or. instruction also has what is known as an "output dependence" on the add. instruction because XER is defined in the add. instruction and is defined again in the or. instruction, which requires that the add. instruction be scheduled before the or. instruction. The lcrcr instruction has a flow dependence on the or. instruction because CR0 is used in the lcrcr instruction and defined in the or. instruction, which forces the or. instruction to be scheduled before the lcrcr instruction.

Fixed registers create bottlenecks in prior art instruction scheduling because instructions from different lifetimes of the same fixed register cannot be interleaved without changing the meaning of the program. For example, consider the instructions that mention the XER register in FIG. 2. There are two lifetimes of XER in FIG. 2: the first consists of the add. and select instructions, while the second consists of just the or. instruction. If the or. instruction were to be moved between the add. and select instructions, the select instruction would read the value in the XER produced by the or. instruction, rather than that produced by the add. instruction, with incorrect results. However, if the or. instruction were to be moved prior to both the add. and select instructions, the program would be correct. Prior art instruction schedulers do not recognize this fact. Rather, they note the anti-dependence between the select and or. instructions, and conclude that the or. instruction may never be scheduled prior to the select instruction. An important aspect of the present invention is to note that dependences between instructions in different lifetimes need not constrain instruction scheduling, provided that if one instruction from a lifetime X is scheduled prior to an instruction in another lifetime Y, then all instructions from lifetime X must be scheduled prior to every instruction in lifetime Y.

Referring again to FIG. 6, once the dependence graph is built (step 610), method 600 "seeds" a "ready list" by placing all instructions that may be scheduled on the ready list (step 620). With the full dependence graph of FIG. 3, the sub instruction is the only instruction that has no dependences on other instructions, so the ready list is seeded with the sub instruction before any instructions are scheduled (i.e., in cycle 0 of FIG. 4). The next step in method 600 is to schedule an instruction from the ready list (step 630). Because the sub instruction is the only instruction on the ready list, method 600 schedules the sub instruction, and we assume that this instruction is scheduled in pipeline 1 as shown in FIG. 5. Once the instruction is scheduled in step 630, all dependences that are satisfied as a result of the just-scheduled instruction are removed from the dependence graph. Thus, the sub instruction and the flow dependence between the add. and sub instruction in the dependence graph of FIG. 3 are removed. As a result, the add. instruction is the only instruction that is ready to be scheduled, so the add. instruction is added to the ready list (step 650), as shown in the Cycle 1 row of FIG. 4. The ready list is not empty (step 660=NO), so step 630 schedules the add. instruction (step 630) after the sub instruction in pipeline 1 (FIG. 5). The flow dependence from the select instruction to the add. instruction and the output dependence from the or. instruction to the add. instruction are then removed from the dependence graph (step 640), and the select instruction is added to the ready list (step 650). This process is repeated for each instruction until all the instuctons have been scheduled, as shown in the sample instruction schedule of FIG. 5.

Note that the instruction scheduler was unable to achieve any parallel operation between pipeline 1 and pipeline 2 because only one instruction at a time was considered and placed on the ready list. An apparatus and method in accordance with the preferred embodiments herein performs more efficient instruction scheduling by recognizing definitions and uses of bottleneck registers, and by treating them differently than other registers during instruction scheduling by scheduling instructions in the same lifetime of a bottleneck register before any instructions in other lifetimes of the same bottleneck register.

2. Detailed Description of the Preferred Embodiments

According to preferred embodiments of the present invention, an instruction scheduler recognizes that some dependences caused by bottleneck registers may not impose real constraints in instruction scheduling if certain requirements are met. The present invention provides a significant advantage over the prior art by achieving a higher degree of parallelism in the instruction schedule.

Referring to FIG. 1, a computer system 100 in accordance with the preferred embodiment is an IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a computer program 126, and an optimizing compiler 128 that includes a lifetime-sensitive instruction scheduler 129 in accordance with the preferred embodiments. While the best mode of the invention has lifetime-sensitive instruction scheduler 129 within optimizing compiler 128, it is equally within the scope of the present invention to provide lifetime-sensitive instruction scheduler 129 separate from any compiler, such as a link-time scheduler. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, computer program 126, optimizing compiler 128, and lifetime-sensitive instruction scheduler 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Computer program 126 represents a computer program in any form, whether source code, intermediate language, machine code, or other forms. Computer program 126 may include system programs (e.g., an operating system), application programs, or any other types and forms of computer programs.

Processor 110 may be constructed from one or more microprocessors and/or integrated circuits, and includes a set of registers 112, a first pipeline 114 and a second pipeline 116. In the preferred embodiment, processor 110 is a Reduced Instruction Set Computer (RISC) processor. Pipelines 114 and 116 are suitably instruction pipelines that can execute instructions in parallel. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 10, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of computer program 126 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 11:
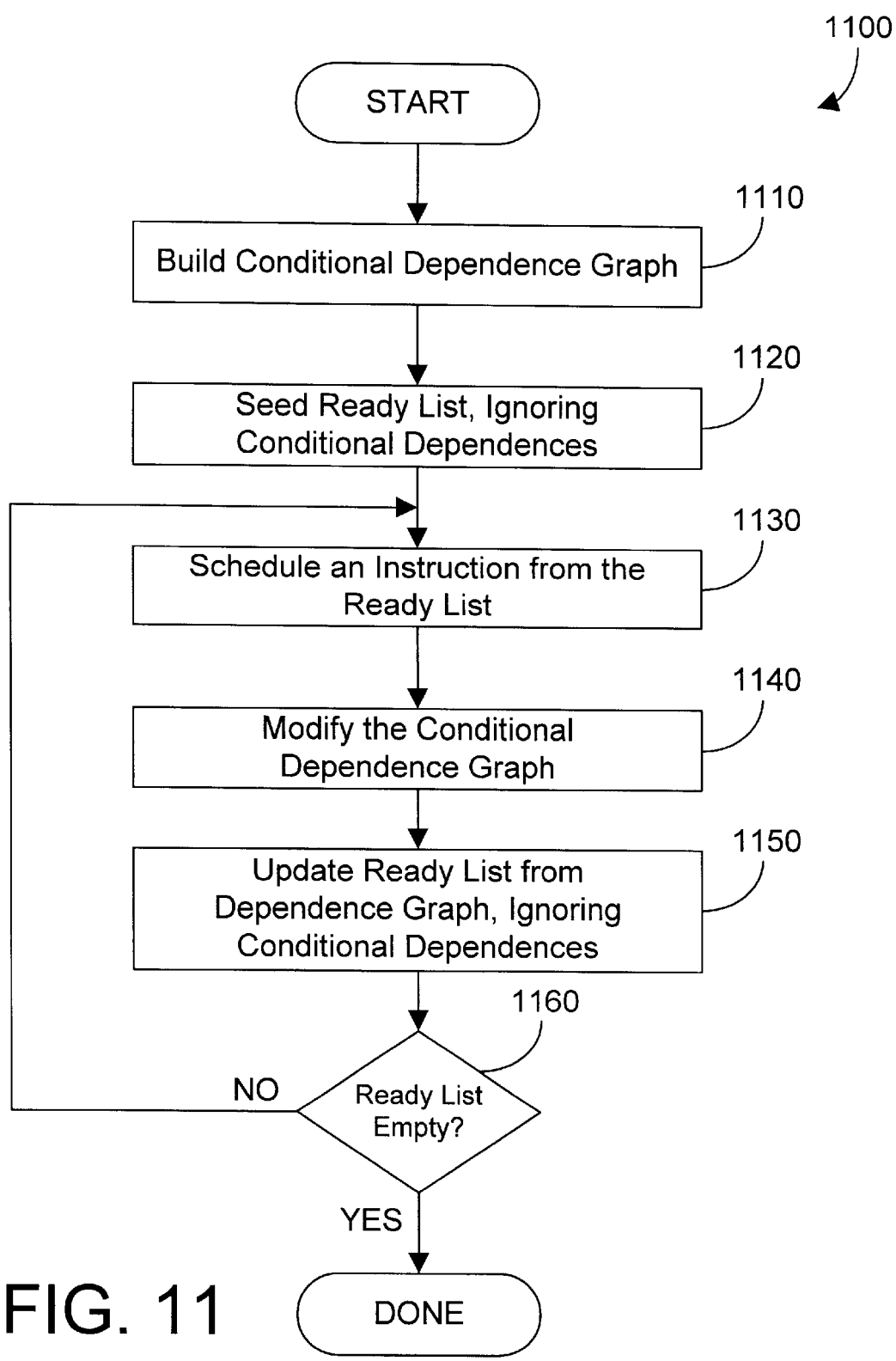
FIG. 11 is a flow diagram of a method for scheduling instructions in a computer program according to a preferred embodiment.

The remainder of this specification describes the details of lifetime-sensitive instruction scheduler 129 in FIG. 1. Referring to FIG. 11, a method 1100 in accordance with a preferred embodiment starts by building a conditional dependence graph (step 1110). For the code portion of FIG. 2, the conditional dependence graph is shown in FIG. 7. The difference between the prior art dependence graph of FIG. 3 and the conditional dependence graph of the invention of FIG. 7 is the presence of two "conditional dependences": the anti-dependence from the or. instruction to the select instruction, and the output dependence from the or. instruction to the add. instruction. These conditional dependences are represented in the dependence graph of FIG. 7 with dotted lines. If an instruction defines and begins an independent lifetime of a bottleneck register, any dependences that the instruction has on previous instructions due to definitions or uses of the bottleneck register are "conditional dependences". A conditional dependence is treated differently than absolute dependences, which are the typical dependences known in the art.

An exception to the foregoing occurs when an instruction defines and begins an independent lifetime of a bottleneck register, and not all instructions in the lifetime are in the window of instructions to be scheduled. In this case any dependences that the instruction has on previous instructions due to definitions or uses of the bottleneck register remain true dependences, rather than becoming conditional dependences. This prevents instructions in the partial lifetime from being scheduled prior to instructions in another lifetime of the same bottleneck register.

The second step in method 1100 seeds the ready list, ignoring all conditional dependences (step 1120). For the dependence graph of FIG. 7, the sub instruction may be placed on the ready list. In addition, the or. instruction has only conditional dependences, so it may be placed on the ready list as well. Because both of these instructions are on the ready list, they may both be scheduled for simultaneous execution in different pipelines. As a result, step 1130 schedules both of these instructions, one in pipeline 1 and the other in pipeline 2, as shown in FIG. 9. Next, the conditional dependence graph is modified to account for the instructions just scheduled. The sub instruction and the flow dependence from the add. instruction to the sub instruction are removed, as in the prior art. However, the conditional dependence graph is modified in a new way to account for the fact that an instruction with conditional dependences has just been scheduled. The conditional dependence graph is modified to assure that any instructions within the lifetime of the bottleneck register defined by the scheduled instruction are scheduled before instructions in other lifetimes of the bottleneck register are scheduled. In other words, the instructions that make up the lifetime of the bottleneck register are "dragged along" with the instruction that defines and begins the lifetime. In this manner an instruction scheduler 129 of the present invention is "lifetime-sensitive". When scheduling an instruction that has conditional dependences, the lifetimes of any bottleneck registers are determined, and any instructions within the lifetime of a bottleneck register are scheduled before any instruction in a different lifetime of the same bottleneck register. Specific mechanics for accomplishing the modification in step 1140 are described in further detail below. For the purpose of this discussion, we assume that the conditional dependence graph is modified in step 1140 to produce the dependence graph in FIG. 10.

Next, the ready list is updated from the dependence graph, again ignoring the conditional dependences. For the dependence graph of FIG. 10, the lcrcr instruction is the only instruction that has no dependences, and no instructions have only conditional dependences. So the lcrcr instruction is placed on the ready list during the first cycle in step 1150, as shown in FIG. 8. The ready list is not empty (step 1160=NO), so the lcrcr instruction is scheduled in step 1130, as shown in the instruction schedule of FIG. 9. The conditional dependence graph is then modified in step 1140 by removing the lcrcr instruction and the dependence from add. to lcrcr from the dependence graph in FIG. 10. The ready list is then updated by placing the add. instruction on the ready list (FIG. 8) in step 1150. The ready list is still not empty (step 1160=NO), so the add. instruction is scheduled in step 1130 during cycle 3, as shown in the instruction schedule of FIG. 9. The dependence graph is modified in step 1140 by removing the add. instruction and the flow dependence from the select instruction to the add. instruction, resulting in a conditional dependence graph with only the select instruction. The select instruction is then placed on the ready list in step 1150, as shown in cycle 3 of FIG. 8. The ready list is not empty (step 1160=NO), so the select instruction is selected from the ready list and scheduled in the fourth cycle in step 1130, as shown in the instruction schedule of FIG. 9. The conditional dependence graph is modified in step 1140 by removing the select instruction, resulting in an empty graph. The step 1150 of updating the ready list does not add anything to the ready list, because the conditional dependence graph is empty, so the answer to step 1160 is YES, and method 1100 is done.

The instruction schedule of FIG. 9 that results from scheduling the code portion of FIG. 2 according to the preferred embodiments results in a schedule that allows concurrent execution of the sub and or. instructions in different pipelines. The prior art method did not allow these instructions to be scheduled for concurrent execution because of dependences caused by bottleneck registers. The instruction scheduler 129 in accordance with the preferred embodiments is intelligent enough to recognize that some dependences may impose certain constraints on the instructions scheduled next, but do not impose absolute constraints as in the prior art. By recognizing the concept of "conditional dependences", the present invention achieves a more optimal schedule of instructions by considering the lifetime of bottleneck registers.

Figure 12:
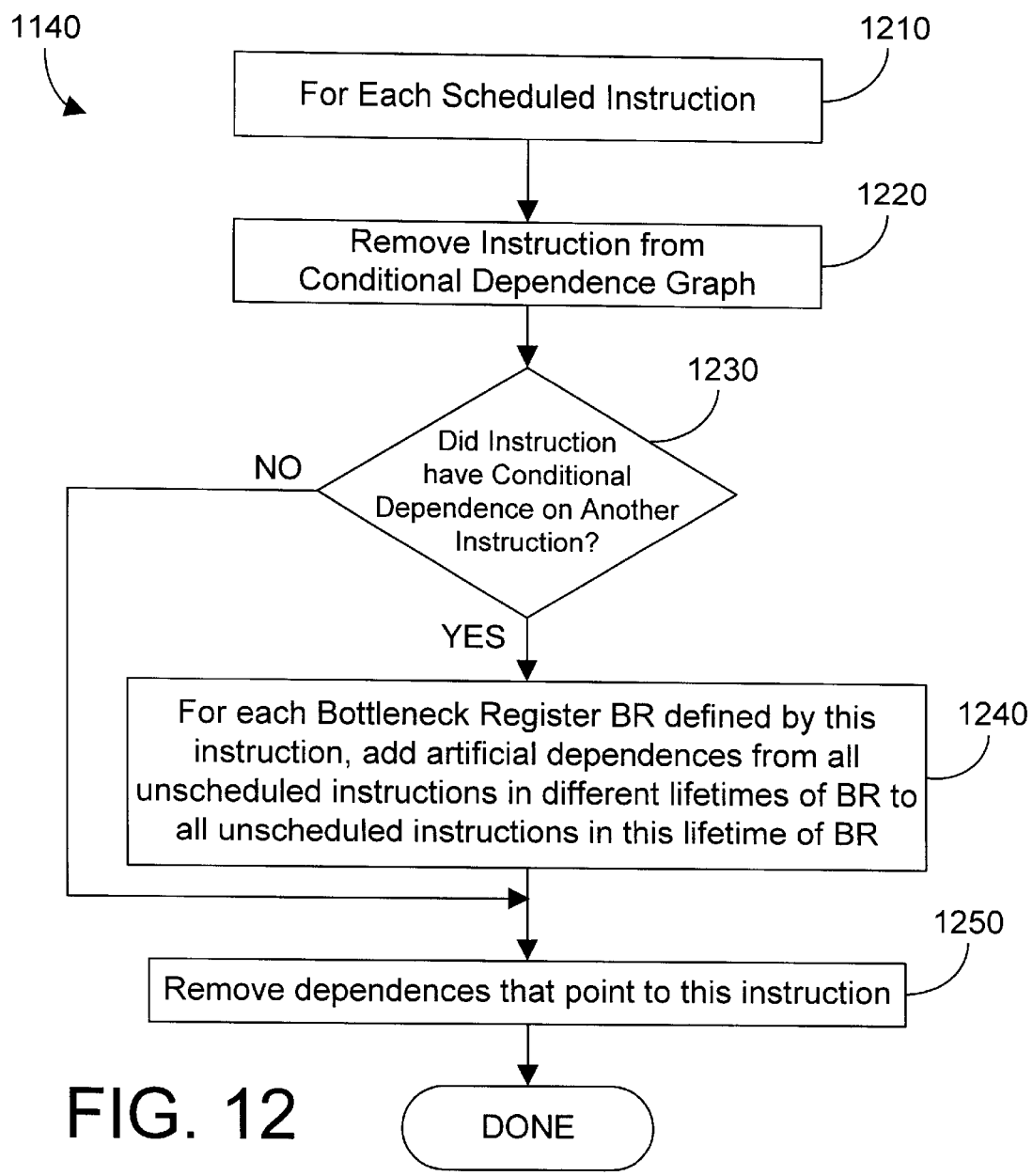
FIG. 12 is a flow diagram for a general method for performing step 1140 in FIG. 11 for modifying the conditional dependence graph.

Referring now to FIG. 12, one specific implementation of step 1140 of FIG. 11 modifies the conditional dependence graph for each instruction that is scheduled during a cycle (step 1210). The instruction is removed from the conditional dependence graph (step 1220). Next, the instruction is analyzed to determine if it has a conditional dependence on another instruction (step 1230). If the instruction has a conditional dependence on another instruction (step 1230= YES), this is an indication that the instruction defines and begins an independent lifetime of a bottleneck register. If this is the case, for each bottleneck register defined by the instruction, we add artificial dependences from all unscheduled instructions in different lifetimes of the bottleneck register to all unscheduled instructions in this lifetime of the bottleneck register (step 1240). Step 1240 essentially guarantees that all instructions in the lifetime of the bottleneck register defined by the instruction just scheduled will be scheduled prior to any instruction in other lifetimes of the bottleneck register. The dependences that point to this instruction are then removed (step 1250).

Applying step 1140 as illustrated in FIG. 12 to the conditional dependence graph of FIG. 7 after scheduling the sub and or. instructions in cycle 1 results in the conditional dependence graph of FIG. 10. To understand how the dependence graph of FIG. 10 is derived, we look in detail at the steps in FIG. 12. First we select the sub instruction in step 1210. We remove the sub instruction from the conditional dependence graph in step 1220, then look to see if the sub instruction had any conditional dependences on another instruction in step 1230. In this case, the sub instruction has no conditional dependence; on any other instructions, so the answer to step 1230 is NO. The final step is to remove the dependence from the add. instruction to the sub instruction (step 1250).

Next, we select the or. instruction in step 1210. We remove the or. instruction from the conditional dependence graph (step 1220). Next, we see if the or. instruction had a conditional dependence on another instruction (step 1230). In this case, the or. instruction has a conditional dependence on both the select instruction and the add. instruction, so the answer to step 1230 is YES. Next, step 1240 determines the bottleneck registers defined by the or. instruction. Referring back to FIG. 2, the or. instruction defies both XER and CR0. Let's first consider XER. Step 1240 first determines whether there are any instructions within the lifetime of XER defined by the or. instruction. In this case, there is no use of XER, so there is no instruction in the lifetime defined by the or. instruction that needs to be considered. Next we consider CR0. There is an instruction, namely the lcrcr instruction, that is in the lifetime of CR0 that is defined by the or. instruction. So step 1240 adds an artificial dependence from all unscheduled instructions in different lifetimes of CR0 to the lcrcr instruction by adding an artificial dependence from the add instruction to the lcrcr instruction. At this point the dependence from the lcrcr instruction that points to the or. instruction is removed (step 1250), and step 1140 is complete.

Figure 13:
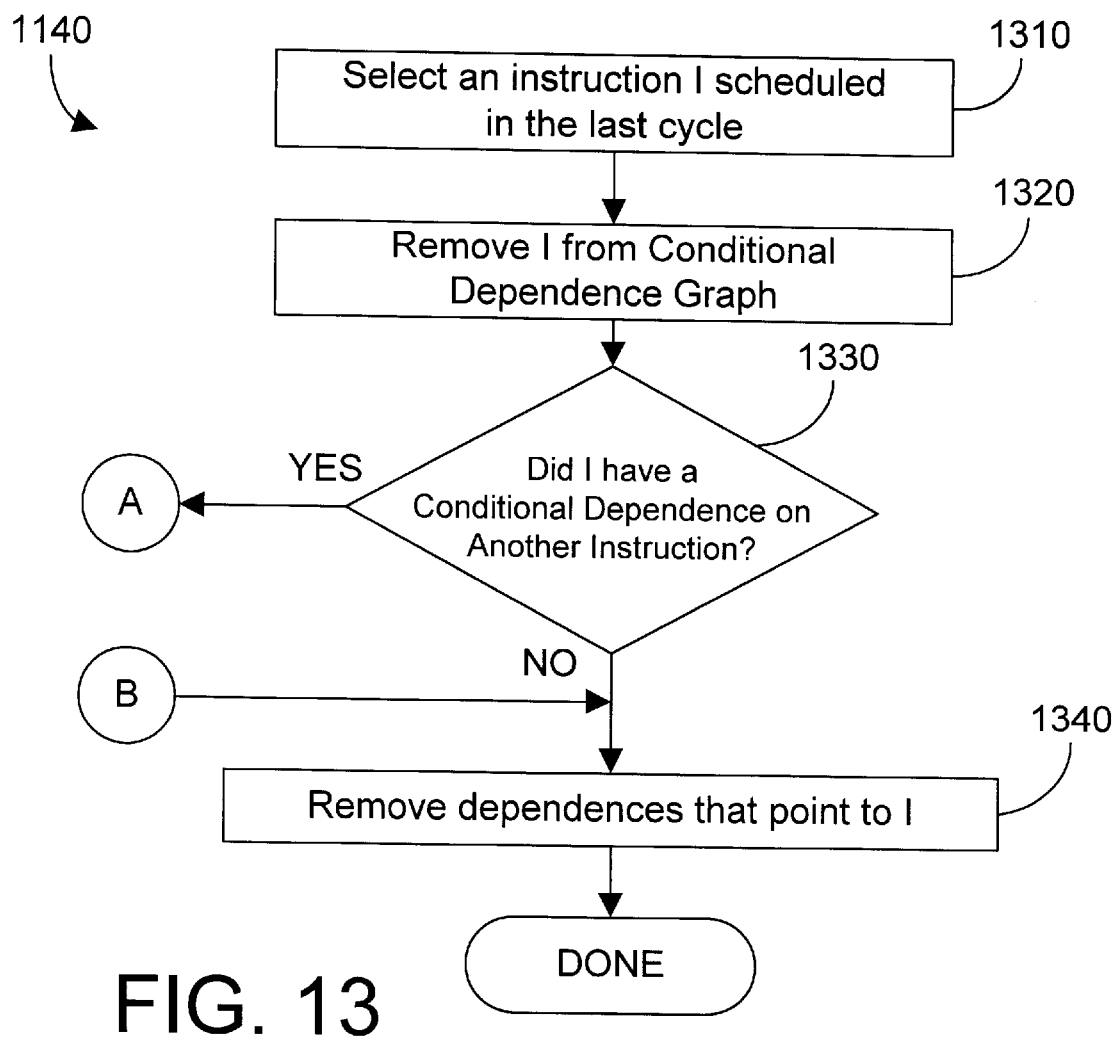
FIGS. 13 and 14 are portions of a flow diagram for a specific method for performing step 1140 in FIG. 11 for modifying the conditional dependence graph.
Figure 14:
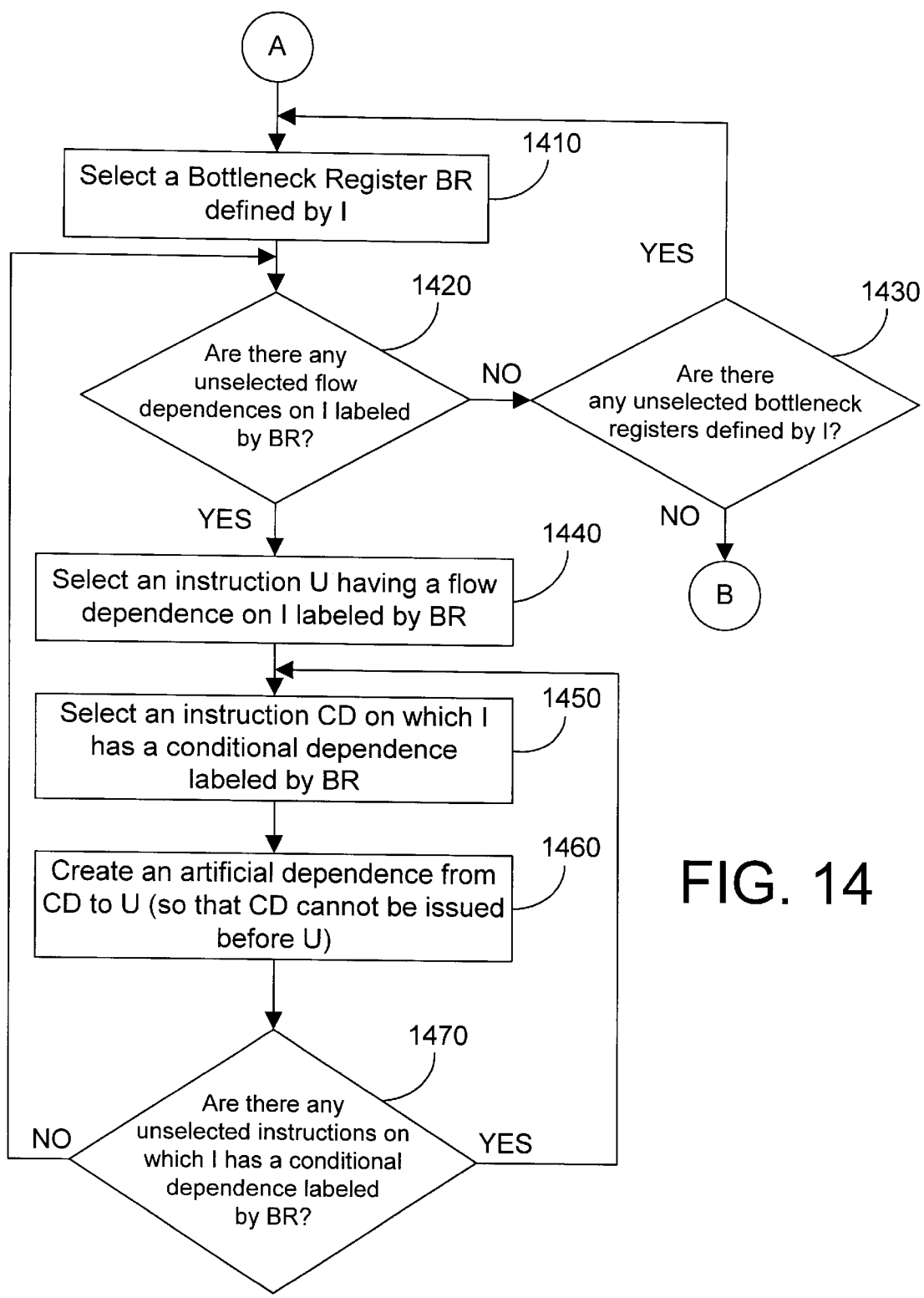

One specific way of implementing step 1140 is represented by the flow diagrams of FIGS. 13 and 14, and uses annotations on the dependences in the conditional dependence graph. Referring to FIG. 7, each dependence that is based on a bottleneck register is labeled with the bottleneck register. Thus, the flow dependence from select to add. is labeled with an XER label to indicate that XER is the bottleneck register causing the dependence. In similar fashion, the anti-dependence from the or. instruction to the select instruction is labeled with XER; the flow dependence from lcrcr to the or. instruction is labeled with CR0; and the output dependence from the or. instruction to the add. instruction is labeled with both XER and CR0. These labels allow easy identification of the bottleneck registers that cause dependences in the conditional dependence graph.

Referring back to FIG. 13, first an instruction I that was just scheduled in the last cycle is selected (step 1310). We assume that the sub and or. instructions were scheduled in cycle 1, so the sub instruction is arbitrarily selected. Next, the sub instruction is removed from the dependence graph (step 1320). Step 1330 determines if the sub instruction had a conditional dependence on another instruction (step 1330). In this case, sub has no conditional dependences on any other instruction, so the answer to step 1330 is NO. Step 1340 then removes the dependence from the add. instruction that points to the sub instruction.

Next, the or. instruction is selected (step 1310). The or. instruction is removed from the conditional dependence graph (step 1320). Next, step 1330 determines that the or. instruction does have a conditional dependence on another instruction (step 1330=YES). The flow diagram of FIG. 14 shows that the next step 1410 selects a bottleneck register defined by the or. instruction. Referring to FIG. 2, the or. instruction defines both XER and CR0. We arbitrarily pick XER first in step 1410, and determine whether there are any unselected flow dependences on the or. instruction that are labeled with XER (step 1420). Referring to the conditional dependence graph of FIG. 7, the or. instruction has no conditional dependences from other instructions with respect to XER, so the answer to step 1420 is NO. Next, step 1430 determines that there is still the CR0 register that has not been considered (step 1430=YES), so the CR0 register is selected in step 1410. Next, step 1420 determines that there is a flow dependence from lcrcr to or. that is labeled with CR0, so the answer to step 1420 is YES. Step 1440 selects the lcrcr instruction. Next step 1450 selects the add. instruction because the or. instruction has a conditional dependence on the add. instruction that is labeled with CR0. Step 1460 creates an artificial dependence from the add. instruction to the lcrcr instruction, as shown in FIG. 10. There are no remaining unselected instructions (step 1470= NO), and no remaining unselected flow dependences (step 1420=NO), and no unselected bottleneck registers (step 1430=NO), so control is returned to step 1340. The dependences that point to the or. instruction are removed, and the resulting conditional dependence graph is shown in FIG. 10.

Another example illustrates the application of the present invention to other types of fixed registers. Referring to FIG. 15, a code portion 1500 includes general-purpose registers than have been allocated to specific instructions, thereby making these general-purpose registers fixed registers for the purpose of each individual instruction. Code portion 1500 is the type of instruction stream that could be scheduled by instruction scheduler 129 after register allocation. Note that the two add instructions $add_0$ and $add_1$ are the same instructions in the processor's instruction set, but are labeled with unique subscripts to allow unique identification of each instruction. Similarly, the $mult_0$ and $mult_1$ instructions are both multiply instructions, with the subscript denoting a specific instance of the instruction.

Code portion 1500 of FIG. 15 is represented by the conditional dependence graph of FIG. 16. By using method 1100 of FIG. 11, the sub and $add_1$ instructions are used to initially seed the ready list of FIG. 17. These instructions are then scheduled in cycle 1, as shown in FIG. 18. Step 1140 is used to generate the conditional dependence graph of FIG. 19, and the $mult_1$ instruction is then placed on the ready list. Method 1100 then schedules the $mult_1$ instruction, followed by the $add_0$ instruction and the $mult_0$ instruction, to produce an instruction schedule as shown in FIG. 18.

The present invention is an improvement over the prior art by recognizing potential parallel operations that the prior art is incapable of identifying. By viewing groups of instructions within the lifetime of a fixed register, the present invention produces an instruction schedule that provides better performance through greater utilization of pipeline resources.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor that includes at least one fixed register;
   a memory coupled to the at least one processor;
   a computer program residing in the memory that includes a selected instruction that defines at least one fixed register; and
   an instruction scheduler residing in the memory and executed by the at least one processor, the instruction scheduler scheduling the selected instruction in a scheduling window, determining the lifetime in the scheduling window of the at least one fixed register defined in the selected instruction, and scheduling at least one other instruction within the lifetime of the at least one fixed register before scheduling any instruction that is in a different lifetime of the fixed register in the scheduling window.

2. The apparatus of claim 1 wherein the instruction scheduler builds a conditional dependence graph of a portion of the computer program and uses the information in the conditional dependence graph to schedule instructions in the selected portion.

3. The apparatus of claim 2 wherein the conditional dependence graph includes a conditional dependence between each instruction that begins an independent lifetime of the at least one fixed register and each previous instruction that defines the at least one fixed register.

4. The apparatus of claim 2 wherein the conditional dependence graph includes a conditional dependence between each instruction that begins an independent lifetime of the at least one fixed register and each previous instruction that uses the at least one fixed register.

5. The apparatus of claim 2 wherein the instruction scheduler schedules any instruction in the selected portion that has no dependences on other instructions in the conditional dependence graph, and wherein the instruction scheduler schedules any instruction in the selected portion that has only conditional dependences on other instructions in the conditional dependence graph.

6. An apparatus comprising:
   at least one processor that includes at least one fixed register;
   a memory coupled to the at least one processor;
   a computer program residing in the memory that includes a selected instruction within a scheduling window, wherein the selected instruction defines at least one fixed register;
   means for scheduling the selected instruction in the scheduling window;
   means for determining the lifetime in the scheduling window of the at least one fixed register defined in the selected instruction; and
   means for scheduling at least one other instruction within the lifetime of the at least one fixed register before scheduling any instruction that is in a different lifetime of the fixed register in the scheduling window.

7. A method for scheduling a plurality of instructions within a scheduling window in a computer program, the method comprising the steps of:
   scheduling a selected instruction in the scheduling window;
   determining the lifetime in the scheduling window of at least one fixed register defined in the selected instruction, wherein the at least one fixed register comprises a physical register in a processor that executes the computer program; and
   scheduling at least one other instruction within the lifetime of the at least one fixed register before scheduling any instruction that is in a different lifetime of the fixed register in the scheduling window.

8. The method of claim 7 wherein the step of scheduling the selected instruction includes the step of scheduling any instruction in the computer program that has no dependences on other instructions in the computer program, and scheduling any instruction that has only conditional dependences on other instructions in the computer program.

9. A method for scheduling a plurality of instructions in a computer program, the method comprising the steps of:
   (A) building a conditional dependence graph from the plurality of instructions;
   (B) seeding a ready list with at least one of the plurality of instructions based on the information in the conditional dependence graph;
   (C) scheduling at least one instruction on the ready list;
   (D) modifying the conditional dependence graph;
   (E) updating the ready list from the modified conditional dependence graph;
   (F) repeating steps (C) through (E) until the ready list is empty, signifying that all of the plurality of instructions have been scheduled.

10. The method of claim 9 wherein the step of building a conditional dependence graph includes the step of inserting at least one conditional dependence between an instruction that defines and begins an independent lifetime of a fixed register and previous instructions on which the instruction has a dependence due to definitions of the fixed register in the previous instructions.

11. The method of claim 9 wherein the step of building a conditional dependence graph includes the step of inserting at least one conditional dependence between an instruction that defines and begins an independent lifetime of a fixed register and previous instructions on which the instruction has a dependence due to uses of the fixed register in the previous instructions.

12. The method of claim 9 wherein the step of modifying the conditional dependence graph comprises the steps of:
   for each instruction scheduled in step (C):
      removing the instruction from the conditional dependence graph; and
      removing dependences that point to the instruction.

13. The method of claim 9 wherein the step of seeding the ready list includes the step of placing on the ready list all instructions that:
   have no dependences on other instructions in the conditional dependence graph; and
   have only conditional dependences on other instructions in the conditional dependence graph.

14. A program product comprising:
   (A) an instruction scheduler that schedules a selected instruction in a scheduling window of a computer program, determines the lifetime in the scheduling window of at least one fixed register defined in the selected instruction, wherein the at least one fixed register comprises a physical register in a processor that executes the computer program, and schedules at least one other instruction within the lifetime of the at least one fixed register before scheduling any instruction that is in a different lifetime of the fixed register in the scheduling window; and
   (B) signal bearing media bearing the instruction scheduler.

15. The program product of claim 14 wherein the signal bearing media comprises recordable media.

16. The program product of claim 14 wherein the signal bearing media comprises transmission media.

17. The program product of claim 14 wherein the instruction scheduler builds a conditional dependence graph of a portion of the computer program and uses the information in the conditional dependence graph to schedule instructions in the selected portion.

18. The program product of claim 17 wherein the conditional dependence graph includes a conditional dependence between each instruction that begins an independent lifetime of the at least one fixed register and each previous instruction that defines the at least one fixed register.

19. The program product of claim 17 wherein the conditional dependence graph includes a conditional dependence between each instruction that begins an independent lifetime of the at least one fixed register and each previous instruction that uses the at least one fixed register.

20. The program product of claim 17 wherein the instruction scheduler schedules any instruction in the computer program that has no dependences on other instructions in the conditional dependence graph, and wherein the instruction scheduler schedules any instruction that has only conditional dependences on other instructions in the conditional dependence graph.

* * * * *